United States Patent [19]
Sakiyama

[11] Patent Number: 5,748,577
[45] Date of Patent: May 5, 1998

[54] DEVICE FOR PLAYING BACK DISKS

[75] Inventor: Kazuhiro Sakiyama, Saitama-ken, Japan

[73] Assignee: Nakamichi Corporation, Tokyo, Japan

[21] Appl. No.: 697,428

[22] Filed: Aug. 23, 1996

Related U.S. Application Data

[63] Continuation of Ser. No. 626,649, Apr. 1, 1996, abandoned, which is a continuation of Ser. No. 216,925, Mar. 23, 1994, abandoned.

[30] Foreign Application Priority Data

Mar. 23, 1993 [JP] Japan ................................. 5-019212

[51] Int. Cl.$^6$ ................................................. G11B 17/22
[52] U.S. Cl. .......................................................... 369/36
[58] Field of Search ................................. 369/36, 38, 39, 369/178, 191

[56] References Cited

U.S. PATENT DOCUMENTS

| | | | |
|---|---|---|---|
| 4,561,078 | 12/1985 | Nakayama | 369/38 |
| 4,567,584 | 1/1986 | Kawakami | 369/38 |
| 4,653,037 | 3/1987 | Nakayama et al. | 369/38 |
| 4,796,244 | 1/1989 | Tsuruta et al. | 369/38 |
| 4,797,865 | 1/1989 | Imai et al. | 369/39 |
| 4,878,137 | 10/1989 | Yamashita et al. | 360/98.05 |
| 4,969,138 | 11/1990 | Ikedo et al. | 369/36 |
| 4,993,008 | 2/1991 | Shiba | 369/3 |
| 5,062,092 | 10/1991 | Siryj et al. | 369/38 |
| 5,123,001 | 6/1992 | Nakamichi et al. | 369/36 |
| 5,177,722 | 1/1993 | Nakamichi et al. | 369/191 |
| 5,299,182 | 3/1994 | Sakiyama | 369/36 |

FOREIGN PATENT DOCUMENTS

| | | | |
|---|---|---|---|
| 62-47893 | 3/1987 | Japan . | |
| 62-83254 | 5/1987 | Japan . | |
| 63-29258 | 2/1988 | Japan . | |
| 63-79273 | 4/1988 | Japan . | |
| 204543 | 8/1988 | Japan | 369/191 |
| 63-130950 | 8/1988 | Japan . | |
| 63-200354 | 8/1988 | Japan . | |
| 63-293756 | 11/1988 | Japan . | |
| 171338 | 5/1989 | Japan . | |
| 150023 | 10/1989 | Japan . | |
| 156459 | 11/1989 | Japan . | |
| 26151 | 2/1990 | Japan . | |
| 26542 | 2/1990 | Japan . | |
| 2143942 | 6/1990 | Japan . | |
| 2260274 | 10/1990 | Japan . | |
| 244388 | 11/1990 | Japan . | |
| 316126 | 4/1991 | Japan . | |
| 3201259 | 9/1991 | Japan . | |
| 424512 | 6/1992 | Japan . | |
| 462157 | 10/1992 | Japan . | |

*Primary Examiner*—Stuart S. Levy
*Assistant Examiner*—George J. Letscher
*Attorney, Agent, or Firm*—Morrison Law Firm

[57] ABSTRACT

A compact disk (CD) changer includes a magazine for storing carriages each capable of carrying a CD. The carriages with the corresponding CDs are selectively removed from the magazine when a selection key is pressed. A drive transports carriages and their associated CDs between an eject position where the CD is accessible for changing and a storage position in the magazine. A carriage and CD in the tray when it is in the eject position can be replaced by a selected carriage and CD by pressing a single selection key. The carriage and CD in the tray are transported to the magazine and the selected carriage and CD removed from the magazine. The tray is then automatically transported back to the eject position.

9 Claims, 6 Drawing Sheets

DEVICE FOR PLAYING BACK DISKS

This application is a continuation of application Ser. No. 08/626,649, filed Apr. 1, 1996, now abandoned, which is a continuation of application Ser. No. 08/216,925 filed Mar. 23, 1994, now abandoned.

BACKGROUND OF THE INVENTION

The present invention relates to devices for playing back recorded media and specifically to devices for changing compact disks.

The present inventor has previously described a stocker-type disk playback device in U.S. Pat. No. 5,123,001. The present inventor has also described such a device having a stock switch for holding a plurality of disks within a stocker in U.S. Pat. No. 5,216,645. In the latter device, a disk is mounted on a movable carriage held by a tray. The tray is brought out to an eject position. When a stock switch is operated, the disk is stored at a lower position within the stocker along with the carriage, the carriage being pulled out of the tray. The stocker is then moved to a topmost position, where empty carriages are stored. The empty carriage is then inserted into the tray and the tray moved to an ejection position where it is available to be loaded.

With this type of prior art device, when a disk is mounted and the stock switch is operated, the disk is installed at a low level in the stocker and the tray returned to the eject position with an empty carriage. This simplifies consecutive storing of disks within the stocker. However, the operation of the stock switch is unique to stocker-type disk playback devices. Users unfamiliar with such devices have a difficult time understanding how it operates. Additionally, since the ejected tray always inserts the empty carriage at the topmost level of the stocker, the operator cannot store a disk at a desired position in the stocker.

OBJECTS AND SUMMARY OF THE INVENTION

An object of the present invention is to provide a multi-disk playing device that overcomes the drawbacks of the prior art.

Another object of the present invention is to provide a multi-disk playback device whose operation is easy to understand and familiar to users of single-disk devices.

Briefly stated, the present invention provides a compact disk (CD) changer that includes a magazine for storing carriages each capable of carrying a CD. The carriages with the corresponding CDs are selectively removed from the magazine when a selection key is pressed. A drive transports carriages and their associated CDs between an eject position where the CD is accessible for changing and a storage position in the magazine. A carriage and CD in the tray when it is in the eject position can be replaced by a selected carriage and CD by pressing a single selection key. The carriage and CD in the tray are transported to the magazine and the selected carriage and CD removed from the magazine. The tray is then automatically transported back to the eject position.

According to an embodiment of the present invention, there is provided a device for playing back disks, comprising: a magazine for storing disks, the magazine having first and second storage positions, a loader having an eject position and a store position, the loader having means for permitting a first disk to be placed in the loader when the loader is in the eject position, the loader having means for storing the first disk in an unselected one of the first and second storage positions, the loader having means for retrieving a second disk stored in a selected one of the first and second storage positions, a controller having input means for selecting the selected one and means for moving the loader from the eject position to the storage position, storing the first disk in the first storage position, retrieving the disk from the second storage position and returning to the eject position with the second disk when the loader is in the eject position, the first disk is placed in the loader and the second position is selected.

According to another embodiment of the present invention, there is disclosed, a device for playing back disks, comprising: a magazine for storing disks, the magazine having first and second storage positions, the loader having means for permitting a first disk to be placed in the loader when the loader is in an eject position, the loader having means for moving the first disk to a playback position, a controller having input means for selecting one of the first and second storage positions, first memory means for saving the second storage position when the second storage position is selected, means for transporting the first disk from the eject position to a load position after a saving of the second storage position, means for transporting the first disk from the load position to a sense position after a transporting of the first disk from the eject position to the load position, disk sensor means for sensing a presence of the first disk in the sense position after a transporting of the first disk from the load position to the sense position, second memory means for saving an indication that the first storage position is occupied after a sensing of the presence of the first disk, means for transporting the first disk from the sense position to the first storage position after a saving of an indication that the first storage position is occupied, alignment means for aligning the second storage position with the loader after a transporting of the first disk from the sense position to the first storage position, means for transporting a second disk from the second storage position to the loader after an aligning of the second storage position with the loader and means for transporting the second disk to the eject position after a transporting of the second disk from the second storage position to the loader.

According to still another embodiment of the present invention, there is disclosed, a device for playing back disks, comprising: means for storing disks, the means for storing having separate positions, each of the separate positions having means for holding a single one of the disks, means for selecting one of the positions and means for transporting a first disk held by a selected one of the positions to an access position and transporting a second disk at the access position to an unselected one of the positions when the selected one is selected and the second disk is at the access position.

According to still another embodiment of the present invention, there is disclosed, a device for playing back disks, comprising: means for storing disks, the means for storing having separate holding positions, each of the holding positions having means for holding a single one of the disks, means for inputting a selected one of the positions, a memory having a first location, means for saving the selected one of the holding positions in the first location upon an inputting of a selected one, means for transporting a first disk from an access position to a sensing position upon the inputting, means for sensing a presence of a disk in the sensing position after a transporting of the first disk from the access position to the sensing position, means for storing the first disk in an unoccupied one of the separate holding positions after a sensing of the first disk and means for transporting a second disk stored in the selected one to the access position after a storing of the first disk.

According to still another embodiment of the present invention, there is disclosed, a device for playing back disks, comprising: a magazine for storing carriages, the magazine having first and second storage positions, the loader having means for holding a one of the carriages, the loader having means for permitting a first disk to be placed in a first carriage held by the loader while the loader is in an eject position, the loader having means for moving the first carriage to a playback position, a controller having input means for selecting one of the first and second storage positions, first memory means for saving the second storage position when the second storage position is selected, means for transporting the first carriage from the eject position to a load position after a saving of the second storage position, means for transporting the first carriage from the load position to a sense position after a transporting of the first carriage from the eject position to the load position, disk sensor means for sensing a presence of the first disk in the carriage after a transporting of the first carriage from the load position to the sense position, second memory means for saving an indication that the first storage position is occupied after a sensing of the presence of the first disk, means for transporting the first carriage from the sense position to the first storage position after a saving of the indication that the first storage position is occupied, alignment means for aligning the second storage position of the carriage with the loader after a transporting of the first carriage from the sense position to the first storage position, means for transporting a second carriage from the second storage position to the loader after an aligning of the second storage position with the loader and means for transporting the second carriage to the eject position after a transporting of the second carriage from the second storage position to the loader.

The above, and other objects, features and advantages of the present invention will become apparent from the following description read in conjunction with the accompanying drawings, in which like reference numerals designate the same elements.

DETAILED DESCRIPTION OF THE PREFERRED EMBODIMENT

Figure 1:
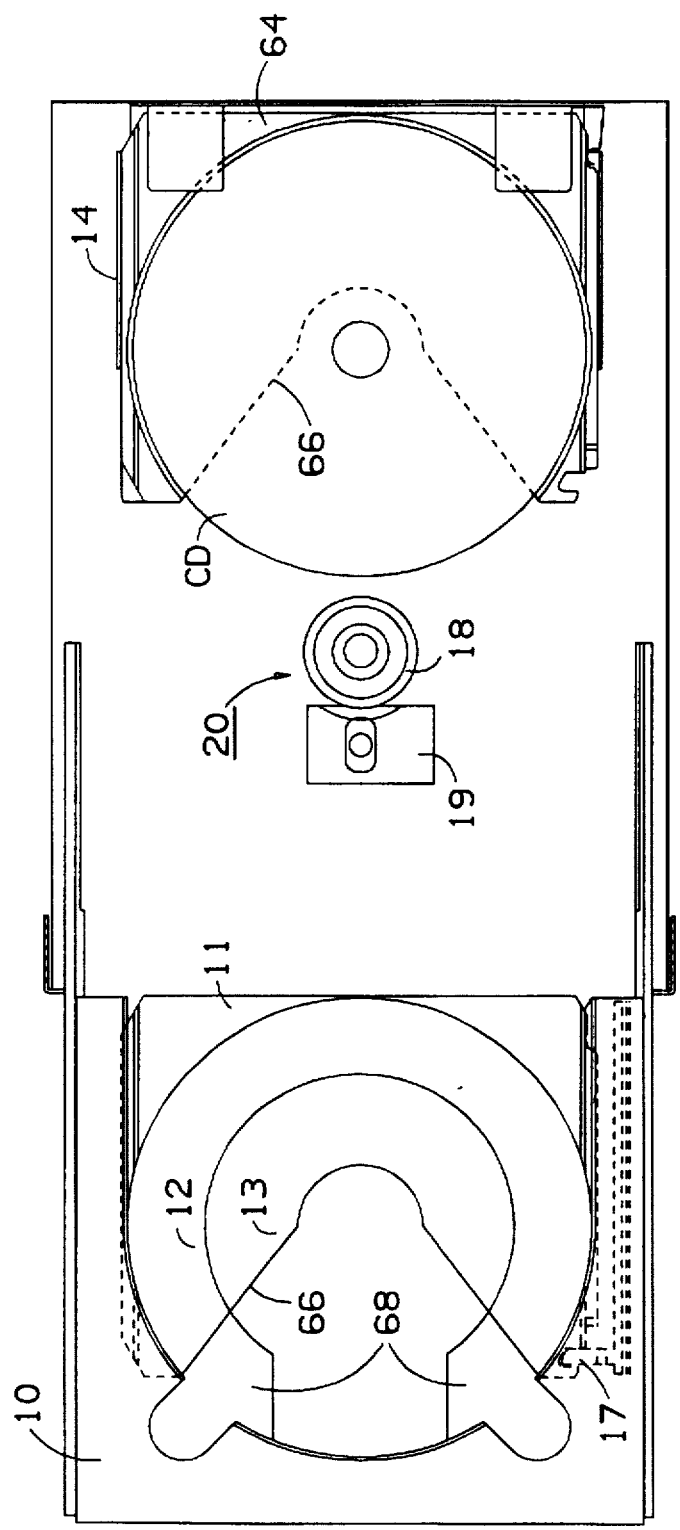
FIG. 1 is a top view of a disk-changing device in an eject mode according to an embodiment of the present invention.

Referring to FIG. 1, an embodiment of a disk player of the present invention has a tray 10 moved to an eject position outside the disk player. A magazine 14 has seven storage positions, only the top one of which is shown, for holding a base carriage 11 and six standard carriages 64 upon which disks CD are carried. A base carriage 11 is shown removed from a base position in the magazine 14. The base carriage 11 is held in the tray 10 at the eject position to permit acceptance or removal of one of the disks CD.

Figure 2:
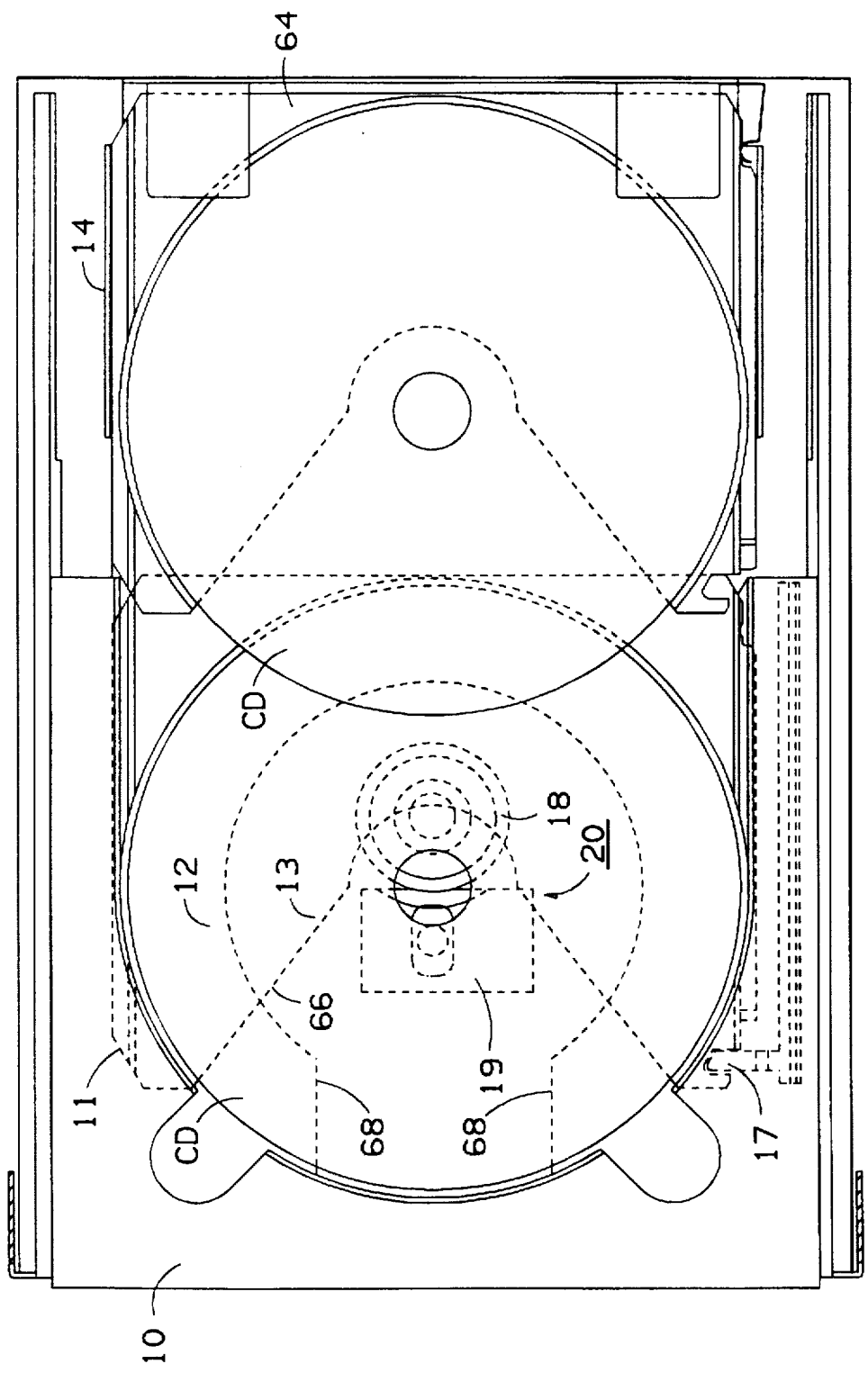
FIG. 2 is a top view of the disk-changing device of FIG. 1 in a load mode.

Referring now to FIG. 2, the tray 10, carrying a carriage 11, 64, is moved by a tray/carriage drive mechanism (not shown) to a load position. The tray 10 is retained in the load position by a locking mechanism (not shown).

Figure 3:
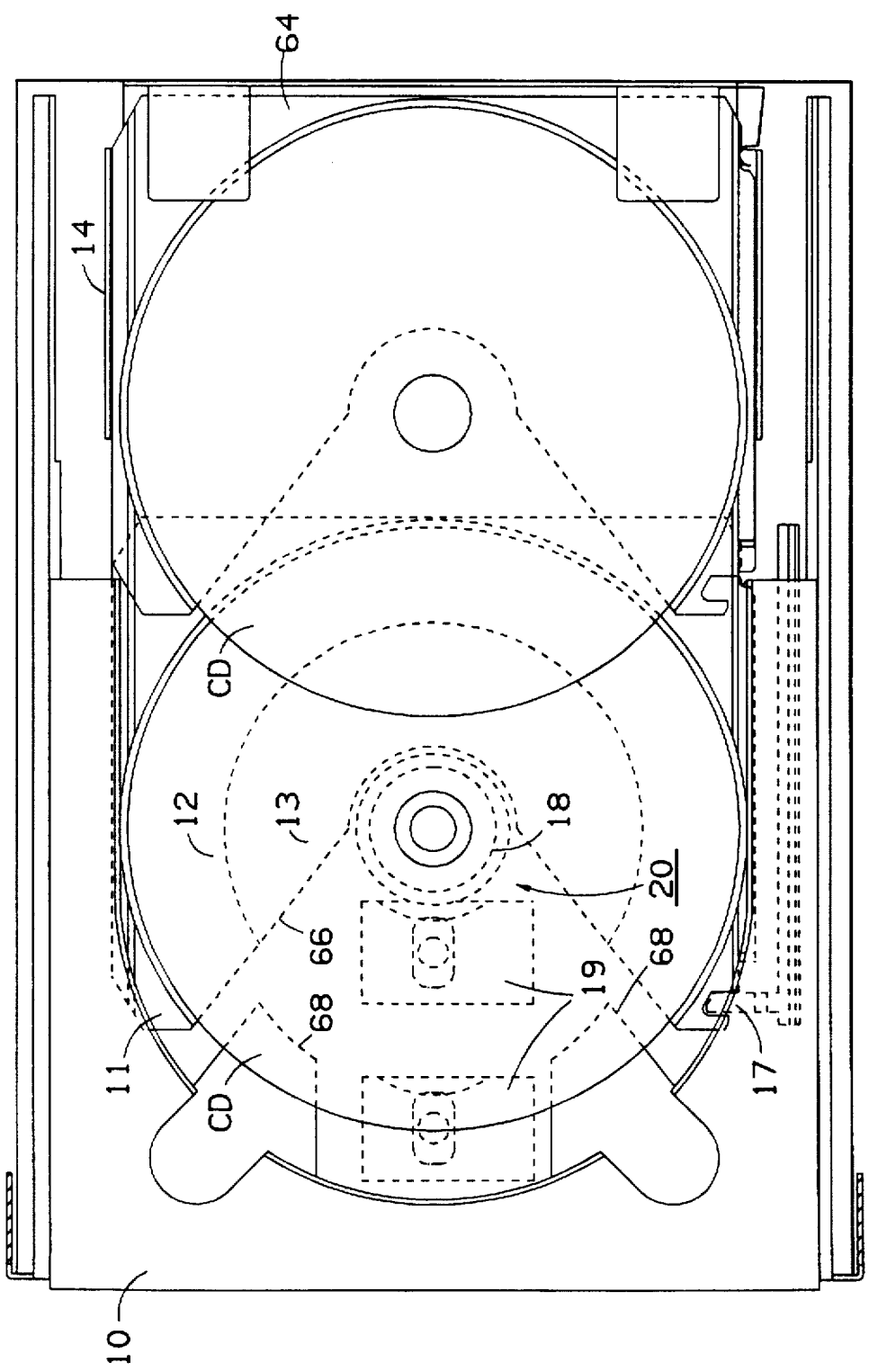
FIG. 3 is a top view of the disk-changing device of FIG. 1 in a playback mode.

Referring now to FIG. 3, the carriage 11, 64 is then moved by the tray/carriage drive mechanism from the load position of FIG. 2 to a playback position. As disclosed in my copending application, separating the carriage 11, 64 from the tray 10 increases the range of travel of a pickup 19 while minimizing the length of tray 10.

The base carriage 11 has first and second concentric circular recesses, 12 and 13, for the acceptance of 12 cm and 8 cm compact disks, respectively. The base carriage 11 is identical to the standard carriages 64 except that the standard carriages 64 do not have the second concentric circular recesses 13.

For manufacturing convenience, the standard carriages 64 may be identical to base carriage 11, including the second circular recesses 13. This avoids the need for two different molds to form base carriage 11 and standard carriages 64, thereby reducing cost without impairing functionality.

The standard carriage 64 and the base carriage have V-shaped cutouts 66 toward their fronts. The V-shaped cutouts 66 prevent the carriages 11, 64 from interfering with a one of the disks CD being played when the tray 10 is moved to a play position, as shown in FIG. 3. When the tray 10 is holding one of the carriages 11, 64 a pair of projections 68 form a continuous disk mounting surface with concentric circular recess 12 of the carriage 11, 64. The pair of projections 68 extend from the tray 10 into the V-shaped cutout 66. The outer edges of the projections 68 fit the inner contour of the V-shaped cutout 66, in the eject and load positions of FIGS. 1 and 2. The projections 68 support the edge of the disk CD, especially when the carriage 11, 64 is moved away from the tray 10 into the playback position of FIG. 3.

Operation of the disk player is described with reference to a selected one of the carriages 11, 64. For ease of illustration, the base carriage 11 is identified as the selected carriage, but it is understood that any of the carriages 11, 64 could be selected.

Referring to FIG. 2, the tray 10 is shown at a load position. A 12 cm disk CD rests on the base carriage 11 ready for loading onto the disk reader assembly 20. In FIG. 3, the base carriage 11 is shown at a playback position, moved away from the locked tray 10, where a center of the disk CD is aligned with a turntable 18. A shuttle 17 engages the base carriage 11. The shuttle 17 is actuated by the transport mechanism (not shown) to move the base carriage 11 from the load position to the playback position. The disk CD is read by a pickup 19 scanning a recording surface of the disk CD as it is rotated by the turntable 18.

Figure 4:
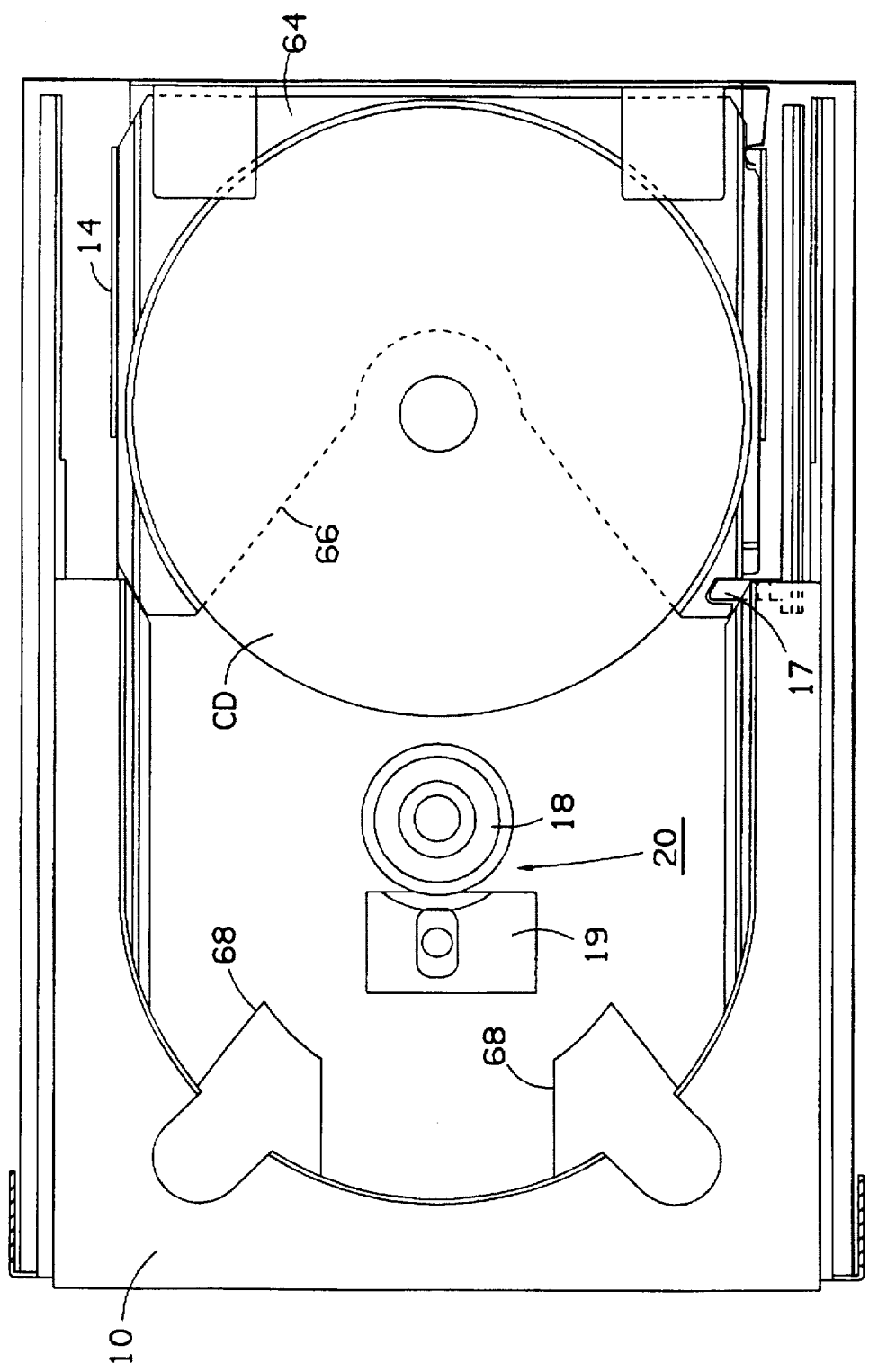
FIG. 4 is a top view of the disk-changing device of FIG. 1 in a storing mode.

Referring now to FIG. 4, the carriage 11, 64 is moved by the shuttle 17 between a stock position and either the load position or the playback position. As shown in FIG. 2, the carriage 11 is held in the tray 10 when the carriage 11 and the tray 10 are in the load position. As shown in FIG. 4, the carriage 11 is held in the magazine 14 when the carriage 11 is in the stock position. As shown in FIG. 3, the disk CD is played in an intermediate playback position of the carriage 11.

To play one of the disks CD in the intermediate, or playback, position, the pickup 19 moves radially to scan the disk CD. In the intermediate position, the disk CD and the carriage 11 are separated from the tray 10 into the playback position. The shifted position of the CD and the carriage 11 permits a smaller overall configuration because the pickup 19 is permitted to move between the positions indicated by broken lines in FIG. 3. If the carriage 11 is not separated from the tray 10, as shown, then the tray 10 requires a corresponding extra length, thereby requiring a larger overall size for the device.

In the above embodiment, it is assumed that the carriage 11 moves through the load position whenever carriage 11 moves to or from the stock position. That is, from stock to load to playback, or from playback to load to stock. In a further embodiment, carriage 11 moves directly from the playback position to the stock position, and directly from the stock position to the playback position without going to the load position.

Magazine 14 moves up and down relative to the shuttle 17 to align a selected one of the carriages 11, 64 with the shuttle 17. Referring to FIG. 4, when all the carriages 11, 64 are stored, the magazine 14 is moved vertically by a magazine/optical movement mechanism (not shown) to align one of the seven positions of the magazine 14, one for each of the carriages 11, 64, with the shuttle 17. In the first position, a first one of the carriages 11, 64 is aligned with the tray 10. In the second position, a second one of the carriages 11, 64 is aligned with the tray 10, and so forth. Vertical movement of the magazine 14 permits a selected disk therein to be aligned with a plane of the tray 10 for transport to the playback, load, and eject positions.

An optical mechanism 20 includes the turn-table 18 and the optical head 19. The optical mechanism 20 is normally hinged downward below the tray 10. When one of the carriages 11, 64 is placed in the playback position, the optical mechanism 20 is moved upward into a reading position to read information on a CD supported on turn-table 18. When the optical mechanism 20 is raised, the CD mounted on the turn-table 18 is clamped to the turntable 18 and rotated. The CD is then read by optical head 19.

Figure 5:
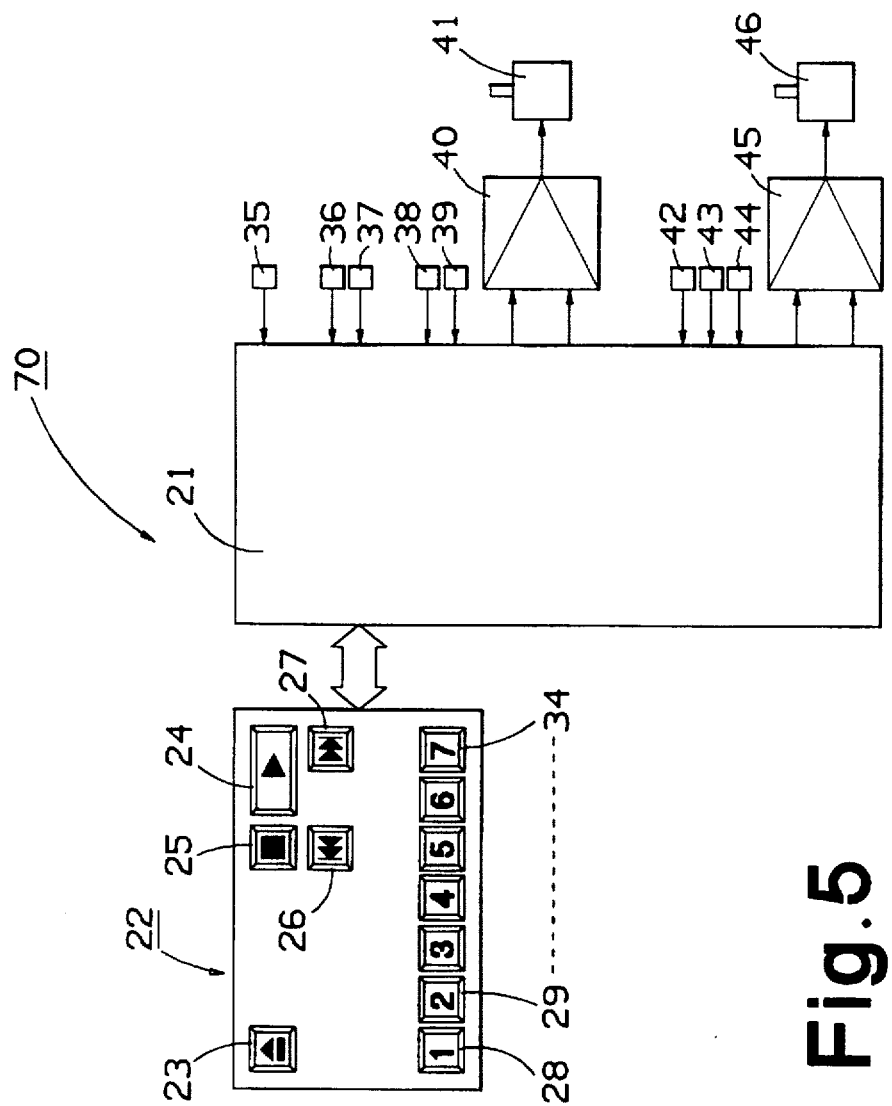
FIG. 5 is a block diagram of control circuit for the disk-changing device of FIG. 1.

Referring to FIG. 5, a control circuit, shown generally at 70, includes a microprocessor 21 which controls each of the drive mechanisms in accord with an operating mode. The operating mode is selected via a control panel 22. In one embodiment, the control panel 22 has an eject/load key 23 for ejecting and loading tray 10. The control panel 22 also includes a playback key 24, a stop key 25 and a tune selection key 26, 27. Also included in control panel 22 are disk selection keys 28 through 34 which allow selection of one of several disks mounted on carriages 11, 64. To describe the control system, the seven carriages 11, 64 are identified below as carriage one through carriage seven.

The microprocessor 21 receives a detection signal from a disk sensor 35. The detection signal indicates whether a disk is mounted on the carriage that is in the playback position. The microprocessor 21 stores in a memory (not shown) the presence or absence of a disk on the carriage. The microprocessor 21 receives detection signals from limit switches 36, 37 which enable the microprocessor 21 to issue commands which stop up and down travel when the optical mechanism 20 reaches its up and down positions, respectively. A detection signal from a position sensor 38 detects the positions of the magazine 14. The detection signal from the position sensor 38 is used by the microprocessor 21 to stop the motion of the magazine 14 at a selected location. A detection signal from a limit switch 39 detects the base position of the magazine 14 for stopping motion of magazine 14 beyond its physical limit.

The microprocessor 21 controls a drive motor 41 for driving a stocker/optical movement mechanism (not shown) via a driver circuit 40. The microprocessor 21 receives detection signals from limit switches 42, 43 which detect the eject position of the tray 10 and the stock position of the carriage 11, respectively. The microprocessor 21 also receives a detection signal from an optical sensor 44 which detects arrival of the carriage 11 at its playback position, or at a reference position near its playback position. The microprocessor 21 controls the rotation of the drive motor 46 for tray/carriage movement mechanism via a driver circuit 45.

Figure 6:
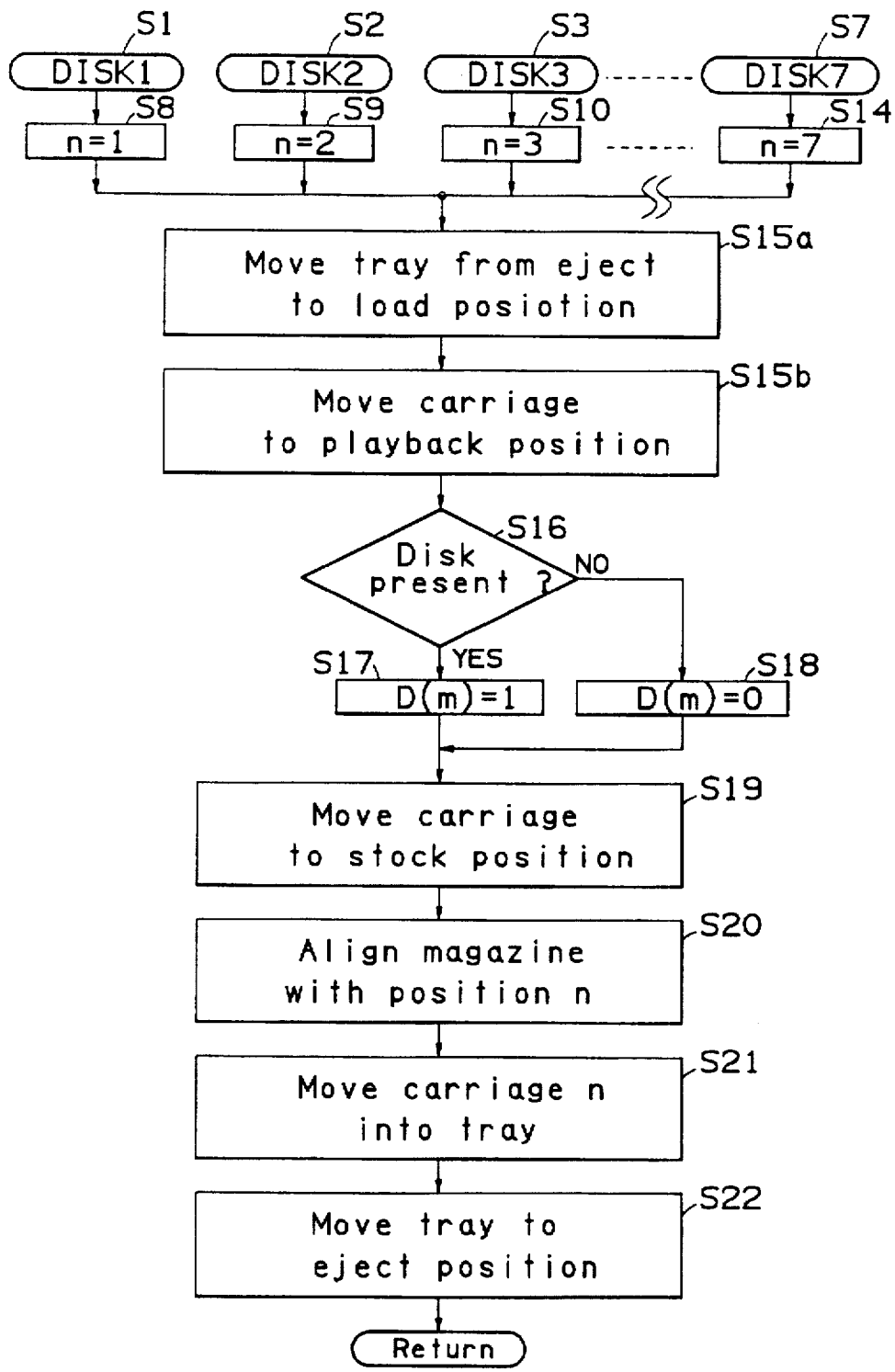
FIG. 6 is a flowchart showing the operation of the control circuit of FIG. 5.

Referring to FIG. 6, disks 1 through 7 are identified by numerals n, 1 through 7. A value of m indicates which one of carriage positions one through seven is aligned with the shuttle 17. Seven memory locations D(m), where m=1 to 7, contain either zero or one, indicating whether a particular magazine location contains a disk. Each of D(1) through D(7) is a flag that indicates the presence of a disk CD on a corresponding one of carriage one through carriage seven. That is, D(m) indicates the presence of a disk in carriage m. A value of "1" for a flag indicates the presence of a disk CD in the corresponding carriage, and a value of "0" for a flag indicates the absence of a disk in the corresponding carriage.

The flowchart shows what happens when carriage m is in the tray 10, in the eject position, and selection switch 30 (corresponding to carriage three) is pressed. The presence of carriage m in the tray 10 indicates that the mth position of the magazine 14 is aligned with the shuttle 17. The following discussion assumes m=1. A disk CD is assumed to be mounted on the tray 10. Control is governed according to the flowchart of FIG. 6 when the selection switch 30 is pressed. Microprocessor 21 passes control from a key-scan control mode (not shown) to step S3.

After setting a memory n to "3" at step S10, the drive motor 46 (FIG. 5) is controlled at step S15a to bring the tray 10 to the load position. Then carriage one, with its disk, in the tray 10, is brought to the playback position in step S15b. At step S16, the microprocessor 21 checks for the presence of a disk on carrier one. At step S17, the microprocessor 21 saves a value of "1", indicating the presence of a disk on carriage one, in flag D(1). This is because carriage one is about to be deposited in position one of the magazine 14. Thus, setting flag D(1) to "1" will show that a disk is stored in position one.

At step S19, the microprocessor 21 controls drive motor 46 to move carriage one into position one inside the magazine 14. At step S20, drive motor 41 lowers the magazine 14 to align the tray with the third position of the magazine 14. At step S21 the drive motor 46 inserts carriage three into the tray 10. At step S22 the tray 10 is moved to the eject position, and control returns to the key-scan control mode.

When the disk CD is mounted on the tray 10 again and the disk selection key 34 (for disk 7) is pressed, the microprocessor 21 passes control from the key-scan control mode to step S7. At step S14, n is set to "7". At step S15a tray 10 is moved to the load position. At step S15b carriage three in the tray 10 is moved to the playback position. Next, the microprocessor 21 checks for the presence of a disk in carriage three at step S16. At step S17, the microprocessor 21 stores a value of "1" in flag D(3) indicating the presence of a disk on carriage three in position three of the magazine 14. At step S19, the microprocessor 21 moves carriage three into position three of the magazine 14. At step S20, the magazine 14 is lowered to align the tray 10 with position seven of the magazine 14. At step S21 carriage seven is inserted in the tray 10. At step S22 the tray 10 is moved to the eject position and control returns to the key-scan control mode.

According to the above control flow, a disk CD and one of the carriages 11, 64 in the tray 10 in the eject position, is returned to the position in the magazine 14 in which that carriage was previously stocked. Then the carriage 11, 64, corresponding to the disk selection key 28–34 that was pressed is placed in the tray 10 and the tray 10 brought again to the eject position.

Note that in a different embodiment, instead of mounting a disk on a carriage and moving it, it is possible to directly move a CD between a tray and a magazine using a roller mechanism or the like, as indicated in Japanese laid-open publication no. 5-74034. Also, a loading mechanism that does not employ a tray can be used. For example, a slot-in device for playing back disks where a CD is directly inserted into a slot could be used. In addition, it is possible to arrange for the load position of the tray to be identical with the playback position.

With the device for playing back disks of the present invention, a one-touch operation of a disk selection key stores a disk previously brought to the eject position back into a magazine. The disk in the position, corresponding to the disk selection key pressed, is returned to the eject position. This allows a disk to be placed at a desired position within the magazine. The mechanism is also very convenient for visually checking the disks within the magazine. This can be done by pressing the disk selection keys in sequence with the tray in the eject position.

Having described preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. A device for playing back disks, comprising:

a magazine for storing disks;

said magazine having at least first and second storage positions;

a loader having an eject position and a store position, and means for moving said loader between said eject position and said store position;

means for permitting a first disk to be placed in said loader when said loader is in said eject position;

means for selecting a selected one of said at least first and second storage positions;

means for detecting the presence of a disk in each of said at least first and second storage positions;

means for storing said first disk in another of said first and second storage positions, different from said selected one whereby, said another does not have a disk;

means for retrieving a second disk stored in said selected one of said first and second storage positions;

control means for controlling said means for storing, said means for retrieving, and said means for moving;

said control means including means for executing an operation including moving said loader from said eject position to said store position, storing said first disk in said another of said first and second storage positions different from said selected one, retrieving said second disk from said selected one and returning to said eject position with said second disk; and said control means including means for automatically initiating and continuously executing said operation responsively to said selected one of said first and second storage position being selected when said loader is in said eject position and said first disk is present in said loader.

2. Apparatus as in claim 1, wherein said first and second disks are compact disks.

3. Apparatus as in claim 1, wherein:

said means for storing includes a first carriage and a second carriage and means for holding said first carriage and said second carriage;

said first carriage having a shape adapted for supporting said first disk;

said second carriage having a shape adapted for supporting said second disk; and said means for retrieving including means for removing second carriage along with said second disk.

4. A device for handling disks, comprising:

means for storing disks;

said means for storing having storage positions, each of said storage positions having means for holding a single one of said disks;

a microprocessor, said microprocessor effective to detect the presence of a disk in each of said storage positions;

means for selecting a one of said storage positions containing a disk;

an access position, said access position being at a position where said disks are inserted into and removed from said device for handling said disks; and means, in response to selecting said one of said storage positions containing a disk, for automatically initiating and continuously executing the steps of: transporting a first disk at said access position from said access position to another of said storage positions which does not have a disk, engaging a selected disk detected at said one of said storage positions, and transporting said, selected disk to said access position.

5. Apparatus as in claim 4, wherein said first and second disks are compact disks.

6. Apparatus as in claim 4, wherein:

said means for storing includes a first carriage and a second carriage and means for holding said first carriage and said second carriage;

said first carriage having a shape adapted for supporting said first disk;

said second carriage having a shape adapted for supporting said second disk; and said means for automatically initiating and continuously executing the steps of transporting a disk including means for selectively moving said first and second carriages.

7. A device for playing back disks, comprising:

a magazine;

said magazine having first and second storage positions;

a microprocessor, said microprocessor effective to detect the presence of a disk in each of said first and second storage positions;

a loader movable between an eject position and a store position;

means for receiving a disk in said loader when said loader is in said eject position;

storing means for transferring said disk from said loader to one of said first and second storage positions which does not have a disk when said loader is in said store position;

retrieving means for transferring said disk from said one of said first and second storage positions to said loader in said store position;

means for selecting a selected one of said first and second storage positions;

means for moving said loader between said eject position and said store position;

a controlling means for controlling said storing means, said retrieving means, and said means for moving;

said controlling means including means for performing an operation that includes moving said loader from said eject to said store position, transferring a loaded disk in said loader to another of said first and second storage positions which does not have a disk, transferring a selected disk from said selected one of said first and second storage positions to said loader and moving said loader back to said eject position; and said controlling means including means for automatically initiating and continuously executing performance of said operation responsive to said selected one of said first and second storage positions being selected while said loaded disk is in said loader and said loader is in said eject position.

8. A device as in claim 7, wherein said means for selecting a selected one of said first and second storage positions includes a corresponding selection key for each of said first and second storage positions and said selected one of said first and second storage positions is selected by pressing one of said selection keys.

9. A device as in claim 7, wherein said means for controlling includes means for storing a value corresponding to said selected one of said first and second storage positions when said selection key corresponding to said selected one of said first and second storage positions is actuated.

* * * * *